T. SMITH.

Waste-Pipe Trap.

No. 132,420.                    Patented Oct. 22, 1872.

Witnesses:
C. Sedgwick
A. Beirnersendorf

Inventor:
T. Smith
PER
Mmmm/Co
Attorneys.

UNITED STATES PATENT OFFICE.

THOMAS SMITH, OF NEW YORK, N. Y.

IMPROVEMENT IN WASTE-PIPE TRAPS.

Specification forming part of Letters Patent No. 132,420, dated October 22, 1872.

*To all whom it may concern:*

Be it known that I, THOMAS SMITH, of the city, county, and State of New York, have invented a new and Improved Waste-Pipe Trap, of which the following is a specification:

This invention is an improvement on the waste-pipe trap for which a patent was granted to me June 18, 1872, No. 128,077, which said trap consists of a box with a hinged valve or gate in it, introduced between two sections of the pipe, so that the waste passes under the free end of the valve to the escape-pipe, the said valve being to stop the wind-gusts which sometimes blow up from the sewers and blow the water out of the water-traps above, so that the gases from the sewers escape into the houses. The said trap is designed to be used as auxiliary to the water-trap. I now propose, by having the waste-pipe leading into the trap enter at the bottom instead of the top, as heretofore, so that its mouth will always be submerged, which was not so before, to make this a water-trap also to effectually shut off the gases from the sewers, as well as a gate or valve-trap to stop the aforesaid wind-blasts, which gases leak or escape through the joints of the valve above the water in the trap described in the aforesaid patent.

Figure 1:
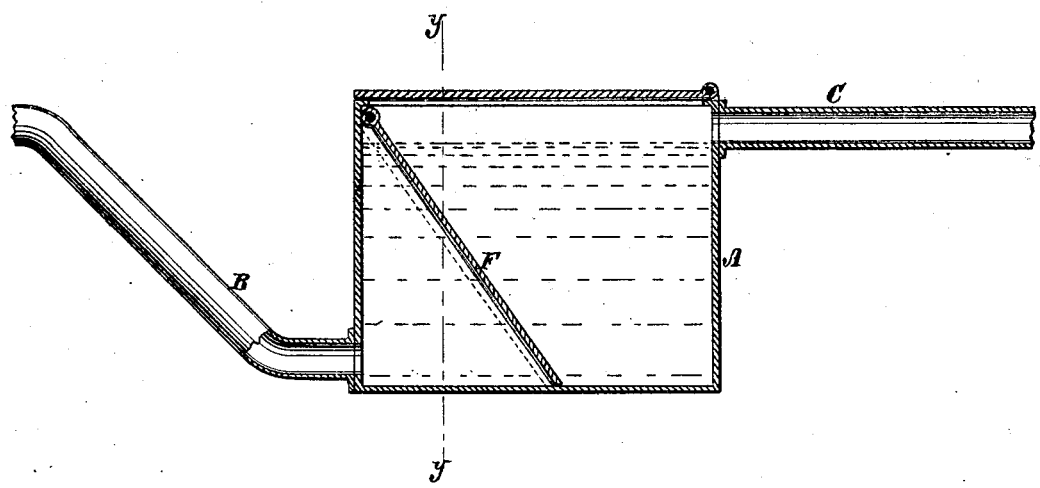
Figure 2:
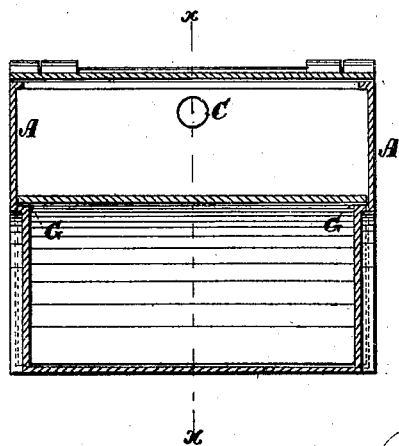

Figure 1 is a longitudinal sectional elevation of my improved trap taken on the line $x$ $x$ of Fig. 2, and Fig. 2 is a transverse section taken in the line $y$ $y$ of Fig. 1.

Similar letters of reference indicate corresponding parts.

A represents the valve-box; B, the waste-pipe discharging into it; C, the pipe discharging from it into the sewer. F is the valve for checking the wind-blasts blowing up from the sewers, and under which the waste flows, said valve being hinged to the box at the top, and resting on oblique ledges G on the sides of the box when closed down. H is the cover of the box, which is hinged and fastened so as to be opened for cleaning the box. I now propose to have the pipe bend downward a short distance from the box and enter it at the bottom, as shown, so that its mouth will always be submerged, and thus convert it into a water-trap also, to prevent the gases from the sewer which leak past the valves at the joints from escaping upward into the buildings, and at the same time I retain all the advantages of the valve in respect of preventing the wind-blasts from blowing up through the ordinary water-traps. I also now propose to form the ledges G on the sides of the box, for the valve to rest on, by casting the said sides with an offset, as represented at G, instead of a special rib attached to the sides, as heretofore, by which I simplify the construction and facilitate the casting.

Having thus described my invention, I claim as new and desire to secure by Letters Patent—

The valve-box A, having inlet waste-pipe B at bottom, outlet pipe C at top, and valve F intermediate and falling diagonally across said box on ledges G G, as and for the purpose described.

THOMAS SMITH.

Witnesses:
ANSON P. THAYER,
ALEX. F. ROBERTS.